United States Patent
Harvey et al.

(10) Patent No.: US 8,869,295 B2
(45) Date of Patent: Oct. 21, 2014

(54) AUTOMATED PRIVACY ENFORCEMENT

(75) Inventors: Ann Charlot Hunaeus Harvey, Iron Station, NC (US); Joan L. Gerrard, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 417 days.

(21) Appl. No.: 12/605,691

(22) Filed: Oct. 26, 2009

(65) Prior Publication Data

US 2011/0099643 A1    Apr. 28, 2011

(51) Int. Cl.
*G06F 21/00* (2013.01)
*H04L 29/06* (2006.01)
*G06Q 10/06* (2012.01)
*G06Q 10/10* (2012.01)
*G06F 21/62* (2013.01)

(52) U.S. Cl.
CPC .......... *H04L 63/102* (2013.01); *G06F 21/6218* (2013.01); *G06F 21/6245* (2013.01); *G06F 2221/2113* (2013.01); *G06F 2221/2141* (2013.01); *G06Q 10/06* (2013.01); *G06Q 10/10* (2013.01)
USPC .................... 726/27; 726/26; 726/28; 726/30

(58) Field of Classification Search
CPC ............ G06F 21/6245; G06F 21/6272; G06F 21/6218; H04L 63/102; H04L 63/105
USPC ................... 726/26, 27, 28, 29; 707/999.001, 707/999.002, 999.009
See application file for complete search history.

(56) References Cited

U.S. PATENT DOCUMENTS

| | | | | |
|---|---|---|---|---|
| 5,469,556 | A * | 11/1995 | Clifton | 711/163 |
| 6,275,824 | B1 * | 8/2001 | O'Flaherty et al. | 1/1 |
| 7,496,191 | B1 * | 2/2009 | Crews et al. | 379/220.01 |
| 7,853,786 | B1 * | 12/2010 | Fultz et al. | 713/166 |
| 7,945,492 | B1 * | 5/2011 | Sun et al. | 705/35 |
| 8,060,536 | B2 * | 11/2011 | Bavly et al. | 707/802 |
| 2002/0156782 | A1 * | 10/2002 | Rubert | 707/9 |
| 2002/0198806 | A1 * | 12/2002 | Blagg et al. | 705/35 |
| 2006/0005036 | A1 | 1/2006 | Hu et al. | |
| 2007/0100773 | A1 * | 5/2007 | Wallach | 705/75 |
| 2007/0192121 | A1 * | 8/2007 | Routson | 705/1 |
| 2008/0120302 | A1 * | 5/2008 | Thompson et al. | 707/9 |
| 2008/0215588 | A1 * | 9/2008 | Mattheisen | 707/9 |
| 2011/0072018 | A1 * | 3/2011 | Walls et al. | 707/737 |

OTHER PUBLICATIONS

PCT/US10/53936, International Search Report and Written Opinion, mailed Dec. 17, 2010.

* cited by examiner

*Primary Examiner* — Linglan Edwards
(74) *Attorney, Agent, or Firm* — Banner & Witcoff, Ltd.; Michael A. Springs

(57) ABSTRACT

A system and method of protecting the privacy of data is presented. The system and method may include receiving data from a data warehouse and determining an access level for each data element received. The access value may be based on the assigned business purpose of the user attempting to access the data. If a user with an assigned business purpose is authorized to access the data then access will be given, if not, access to the data will be denied. In some examples, the requesting user may request to override the security settings in order to obtain access to the data.

20 Claims, 8 Drawing Sheets

AUTOMATED PRIVACY ENFORCEMENT

BACKGROUND

Maintaining the privacy of individuals and their personal information is an important priority in today's digital age. With personal information being more available than ever, companies accessing that information, including financial institutions, must be vigilant about protecting that data.

Data warehouses are often used to store mass quantities of customer or other individual data and can often be a wealth of information for a company. However, due to the sensitive nature of much of the data, various government regulations, contractual obligations, and the like, these data warehouses often restrict access to their data to a very limited few individuals. Accordingly, a system of privacy enforcement that provides access to information on a "need-to-know" basis while maintaining the security of the data would be advantageous.

SUMMARY

The following presents a simplified summary in order to provide a basic understanding of some aspects of the disclosure. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to maintaining data security and providing secure access to data, for instance, data stored in a data warehouse. The systems and methods may include assigning a business purpose to an employee of an entity. The systems and methods may further include identifying a plurality of data elements associated with at least one customer of the entity and evaluating each data element of the plurality of data elements to determine a level of access to the data element. The systems and methods may further include assigning an access value to each data element corresponding to the employee based on the business purpose of the employee.

Aspects of this disclosure may further relate to receiving data including a plurality of data elements associated with at least one customer of an entity and identifying a plurality of employees of the entity that may access the data and assigning a business purpose to each employee. In some examples, the systems and methods may include evaluating each data element to determine an access level associated with each data element and the business purpose assigned to each employee and assigning an access level to each data element based on the business purpose associated with each employee of the entity. In still other examples, the systems and methods may further include receiving a request to access at least one data element within the customer data table and evaluating the access level of an employee making the request to access the at least one data element within the data table. The systems and methods may further include responsive to determining that the access level of the requesting employee meets a predetermined criteria, providing access to the at least one data element within the customer data table.

In still other aspects, the systems and methods may further include responsive to determining that the access level of the requesting employee does not meet the predetermined criteria, not allowing access to the at least one data element within the customer data table. The systems and methods may also include, responsive to determining that the access level of the requesting employee meets the predetermined criteria, providing access to the at least one data element if the customer associated with the at least one data element has consented to share the at least one data element and responsive to determining that the access level of the requesting employee meets the predetermined criteria, denying access to the at least one data element if the customer associated with the at least one data element has not consented to share the at least one data element.

Aspects of this disclosure may also relate to one or more computer-readable media and/or an apparatus having one or more processors and one or more memories storing computer readable instructions that, when executed, cause one or more processors to perform the methods described herein.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate securing data and providing secure access to data. The data security system may be used to protect locally stored data or may be used in conjunction with data stored in, for instance, a data warehouse. The data security system may include a listing of all users and a business purpose assigned to those users for a particular entity. An entity may, in some examples, include a company, division of a company, designated group within a company, and the like. Further, any customer preferences for sharing data may be considered in the data security system. Finally, an access value may be assigned to each data element based on the business purpose assigned to the user or employee attempting to access the data. In some examples, the access value may allow a user having a determined business purpose to access the data, may deny access to the data, or may defer to a customer preference. As used herein, a business purpose may be a category assigned to a user or employee or group of users or employees having similar job duties, and the like. The category may encompass various employees that may require or desire access to similar types of data in the course of business. In one arrangement, a business purpose may include a grouping of individuals having similar purposes in accessing data.

Figure 1:
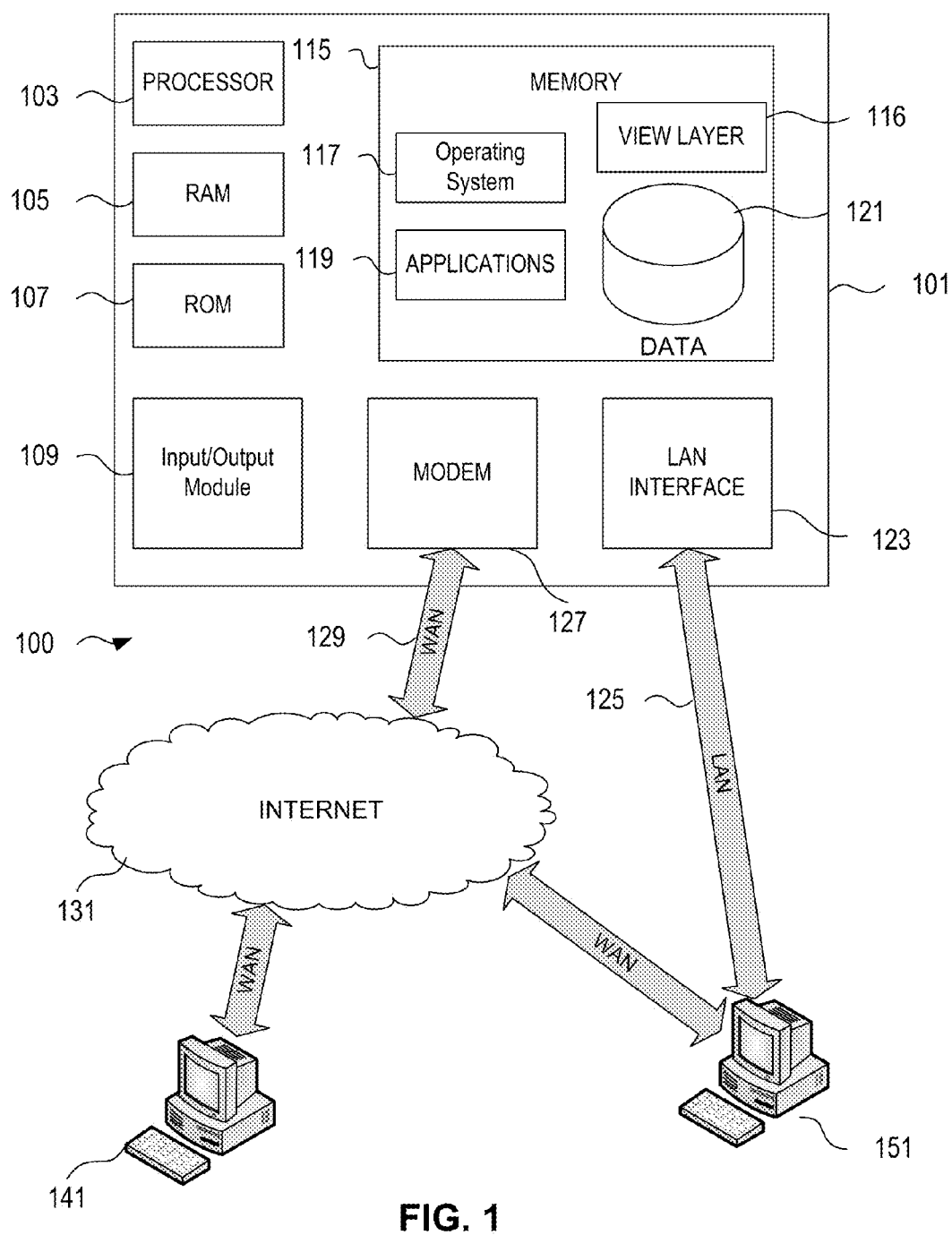
FIG. 1 illustrates an example of a suitable operating environment in which various aspects of the disclosure may be used.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115. The generic computing device 101 may also include a view layer 116 for providing access to data. In some arrangements, the data being accessed via the view layer 116 may be data stored in a local database, such as database 121, or may be data stored externally, such as in a data warehouse.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
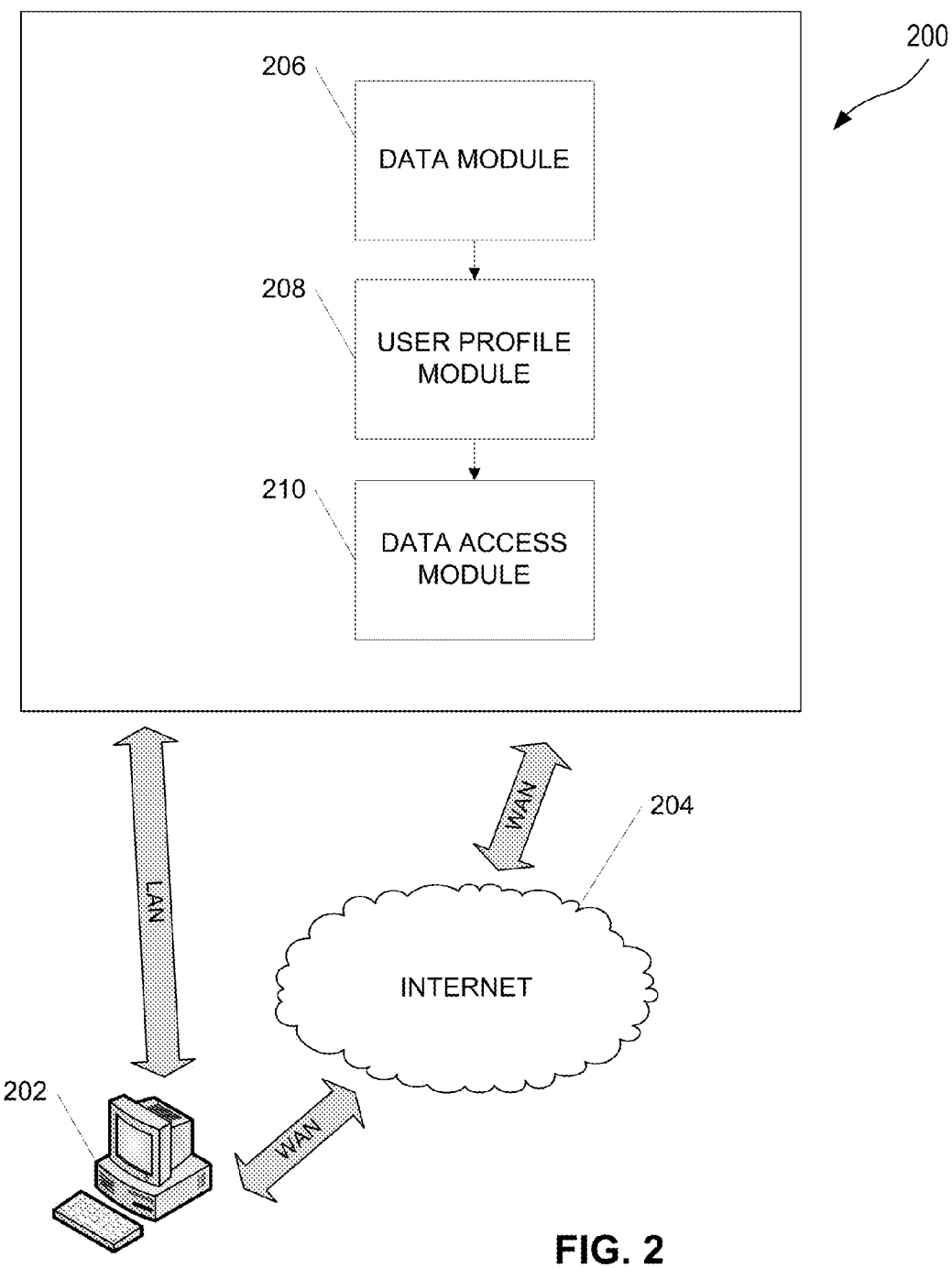
FIG. 2 illustrates one example computing environment in which the data security system may be used in accordance with aspects described herein.

FIG. 2 illustrates one example computing environment in which a data security system according to aspects described herein may be used. The data security system 200 may include a data module 206. In some examples, the data module 206 may include a database of information maintained by the entity employing the security system (e.g., a financial institution, store, and the like). In other examples, the data module 206 may include data from an outside source, such as a data warehouse. A data warehouse may store large quantities of information associated with various individuals, businesses, organizations and other entities. In some examples, the data warehouse may store information associated with various individuals, including personal data such as gender, marital status, residence information, Social Security Numbers, and the like. In other examples, the data warehouse may be used to store inventory information or other retail store information. Data stored in a data warehouse may generally be accessed, via the data warehouse, by several entities, such as financial institutions, retail stores, airlines, telecommunications companies, and the like.

As mentioned above, data stored within the data warehouse may be sensitive information that users might generally prefer to maintain as private or confidential. For instance, the data warehouse may store information such as marital status, gender, Social Security Number, annual income, and the like. In some situations, various government regulations dictate when and if this information can be given out or accessed. For instance, government regulations such as the Fair Housing Act, Fair Credit Reporting Act, Equal Credit Opportunity Act, and the like, often restrict when and how data may be shared. In order to conform to these government regulations, it would be beneficial to restrict and/or control access to various data elements stored within the data warehouse in order to maintain privacy.

In some examples, the data warehouse may store data in a data table. However, the data warehouse may restrict access to the raw data contained within the data table but may instead allow access to a view of the data. Various other privacy and/or security measures may be in place with respect to the data warehouse, data within the warehouse, and/or access to the data. Aspects of this disclosure relate to joining the data contained within the data warehouse to additional security measures in order to provide secure access to data stored in the warehouse while limiting access to individuals and/or entities permitted or authorized to access the data or portions thereof.

The data security system 200 may further include a user profile module 208. The user profile module 208 may, in some arrangements, include data regarding users who may be accessing data stored in the data warehouse, such as data contained in the data module 206. The user profile module 208 may include, for instance, names of employees of an entity using the data security system 200, as well as their job function, employee number or other identifier, and the like. In some arrangements, the user profile module 208 may include a business purpose associated with each employee. For instance, some or all employees or users of the system 200 may be assigned a business purpose that may define a level of access for the individual. That is, an employee may be assigned a business purpose based on their job duties, organization in which he or she works, and the like. Access to data may be permitted based on this assigned business purpose, as will be discussed more fully below.

The data security system 200 may further include a data access module 210. In some examples, the data access module 210 may permit access to various data elements based on the assigned business purpose of the employee. For instance, an employee or user may attempt to access various data elements within the data warehouse. The data access module may then use a look-up table to determine whether the assigned business purpose for that particular employee or user (i.e., in the user profile module 208) is eligible to view that data. If that business purpose is approved for viewing that particular data, the data access module 210 may permit access. If not, the data access module 210 may deny access. In some arrangements, these attempts to access the data security system 200 or data within the data module 206 may be performed via a user interface, such as user interface 202 which may include a standard computing environment including one or more processors, memory, and the like. The user interface 202 may be used to access the data security system 200 via one or more networks, such as the Internet 204.

Figure 3:
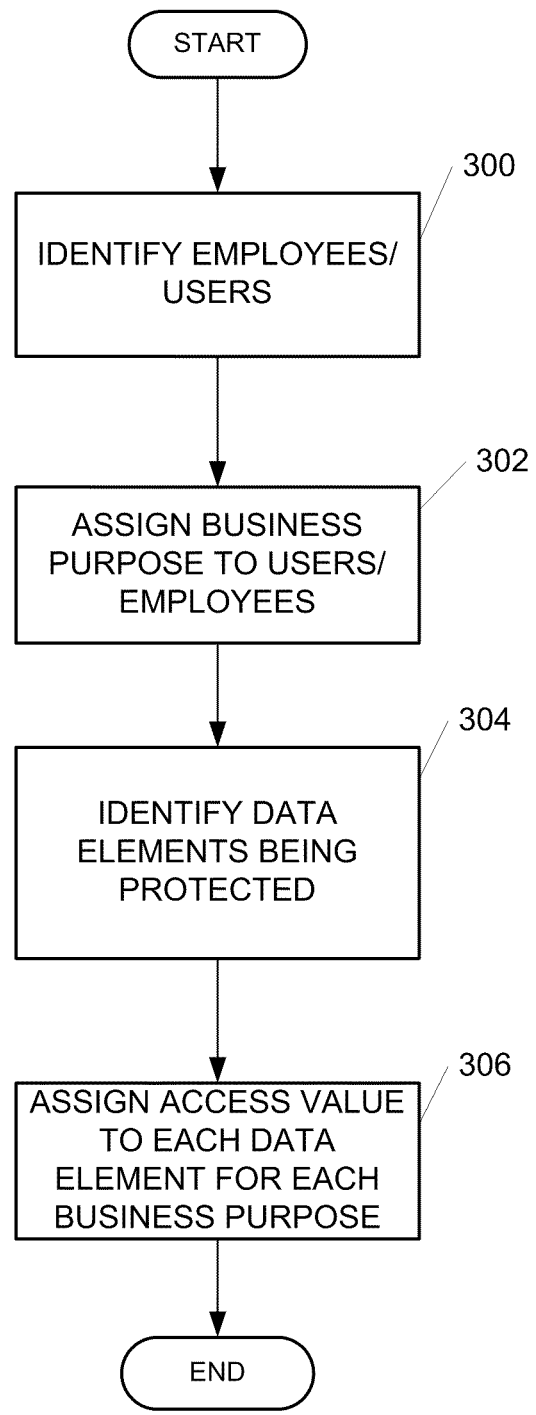
FIG. 3 illustrates one example method for protecting data, such as data in a data warehouse, in accordance with at least some aspects described herein.

FIG. 3 illustrates one example flow chart for protecting data within a data store or data warehouse, and for providing access to that data. In step 300, one or more users or employees of an entity are identified. These employees may, in some examples, be users who may attempt to access data stored in a data store or data warehouse, as discussed above. In some examples, the identified employees may be all employees of a company, entity, and the like. In other examples, the identified employees/users may be a subset of all employees within a company or entity. Once the employees or users are identified, each identified employee or user may be assigned a business purpose in step 302. Business purposes may be industry-specific and may vary based on the particular entity implementing the data security system 200. For instance, in a financial institution, some assigned business purposes may include data modeling or segmentation, sales of credit products for real estate, training and personnel, corporate real estate, sales of consumer credit products (non-real estate), and the like. The business purpose may be used to determine and/or provide access to various data elements within the data warehouse and may be determined based on job duties, employment status (e.g., full-time, contract, and the like), and the like.

In step 304, various data elements being protected are identified. As discussed above, various government regulations, and the like, attempt to control distribution of confidential information associated with customers or individuals. In order to conform to these government regulations, data elements within the data warehouse that must or should be protected are identified. In some examples, the data security system may be expandable to include additional data elements, even after the system has been implemented. In still other examples, the data elements may include an outside source data element which may include any or all data obtained from an outside source (such as a credit bureau) rather than from first hand experience between the company or entity and the customer. In some examples, a customer may determine whether this outside data may be shared or accessed, for instance, in a customer preference table, as will be discussed more fully below.

Figure 4:
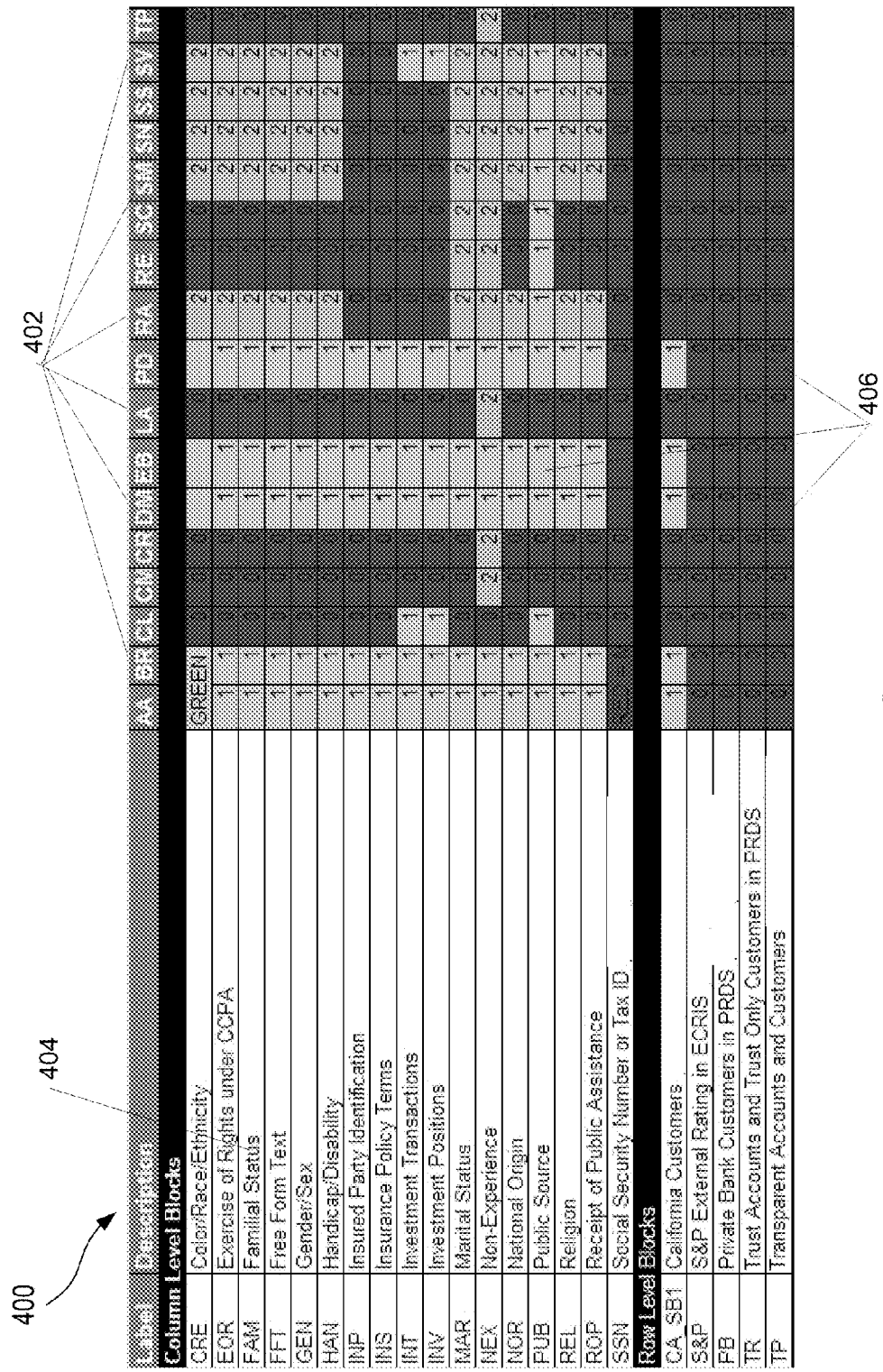
FIG. 4 is an example look-up table indicating access values for various data elements and users having assigned business purposes in accordance with at least some aspects described herein.

Once the data elements are identified, each data element is assigned an access value for each business purpose in step 306. For instance, a value is assigned to each data element either permitting or denying access to that particular data element for each business purpose. This information may be stored in a look-up table, such as the table 400 shown in FIG. 4.

Table 400 includes a listing of all data elements 404 that may be protected in column labeled "Description". The data elements 404 may generally be listed in rows and may include items such as gender, race, religion, disability, and the like. In some examples, the state or city of residence of the individual may also be stored. For instance, some states, such as California, have particular regulations restricting the sharing of various data elements for California residents. Accordingly, in some examples, the look-up table 400 may include an entry for whether the individual is a California resident. In addition, the look-up table 400 includes a plurality of column headings listing the various business purposes 402 determined and assigned to various employees of the company or entity attempting to access the data. As discussed above, these business purposes 402 may be based on job duties of an employee, position within the hierarchy of the organization, and the like. The intersection of the business purpose column heading 402 and the row including the data element 404 includes an assigned access value 406 for each data element 404 and each business purpose 402. This assigned access value 406 may generally dictate whether an individual having that assigned business purpose 402 is permitted to access that data element 404. In some examples, such as table 400, the access value 406 may be a 0, 1 or 2. For instance, an assigned access value of 0 indicates that that business purpose 402 may not access that data element 404. An access value of 1 indicates that that business purpose 402 may access that data element 404 and an access value of 2 indicates that business purpose 402 has conditional access to data element 404. In one example, conditional access may include a determination of whether a particular customer has permitted access to their individual data, for instance, in a customer preference table. In other examples, a customer may elect to "opt out" of sharing their data, in which case no access would be provided to these data elements 404. Although access values 0, 1, and 2 are used herein, these are merely examples of one access value system and various other weighting or valuing systems or schemes may be used without departing from the invention. It should also be noted that, although an access value may be assigned to each data element 404 for each business purpose 402, an employee not receiving access to a data element 404 may request to override the system and receive access to that data element 404, as will be discussed more fully below.

Figure 5A:
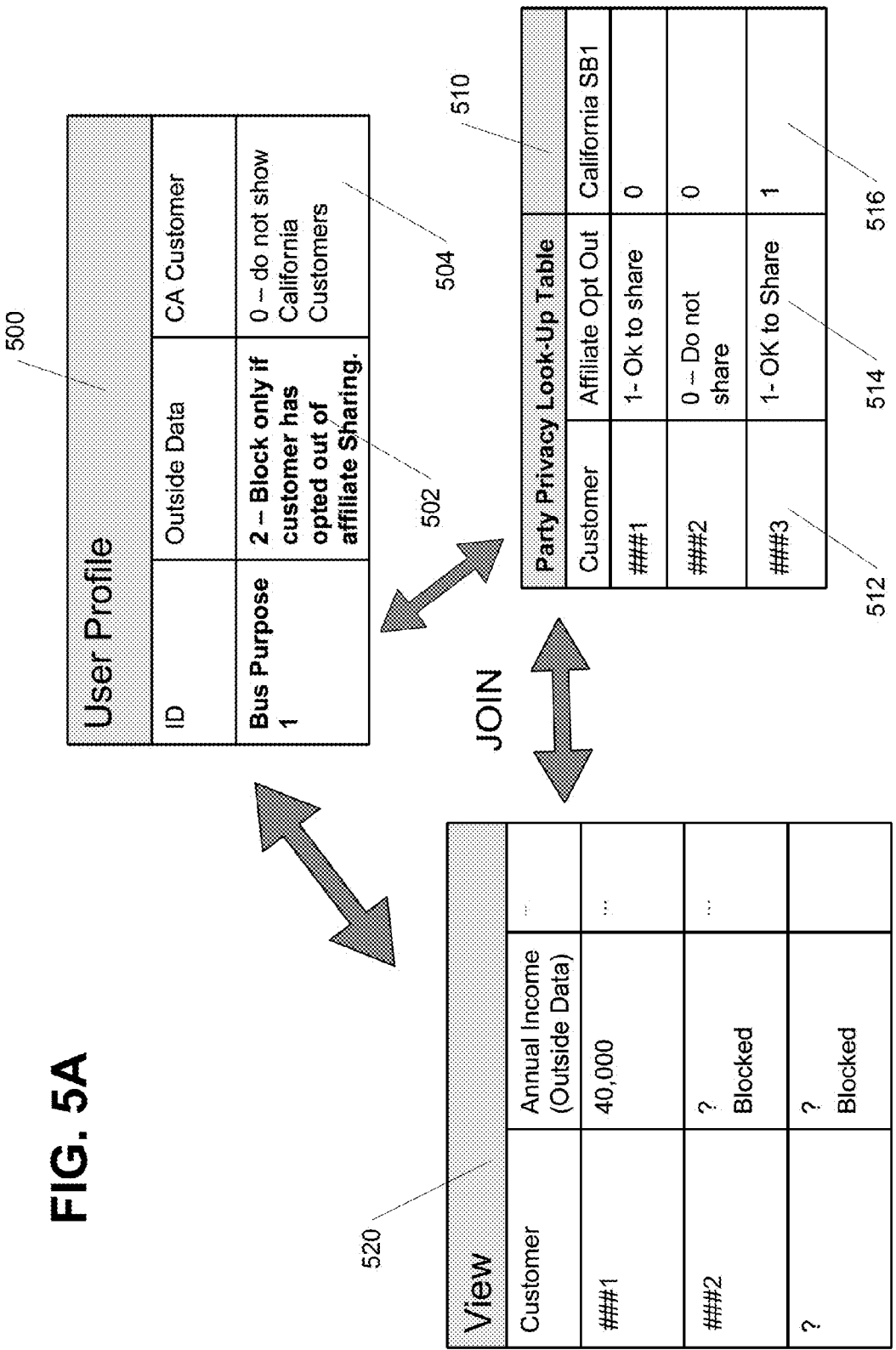
FIGS. 5A and 5B illustrate various look-up tables and data access scenarios in accordance with at least some aspects described herein.
Figure 5B:
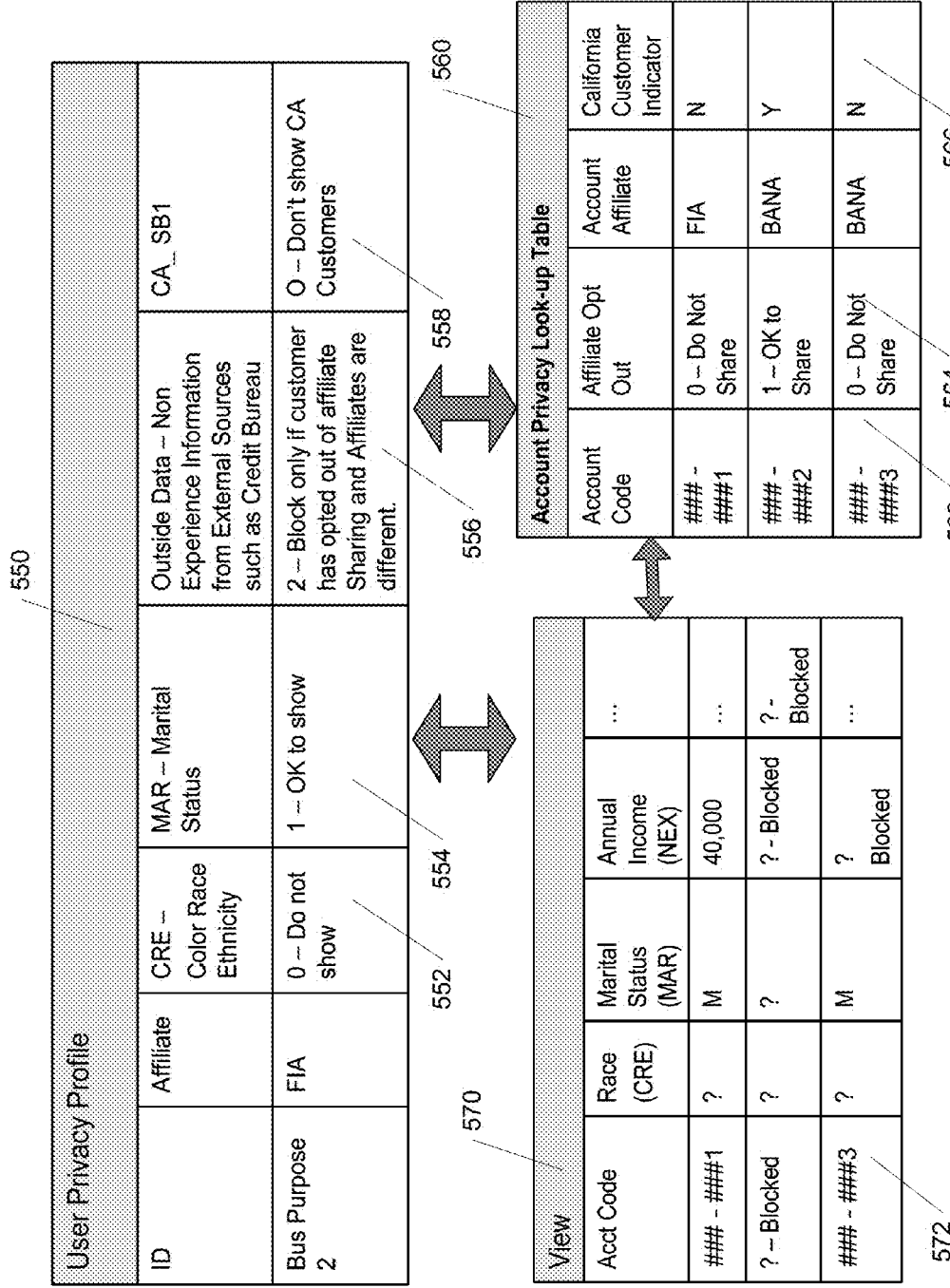

FIGS. 5A and 5B illustrate two example scenarios for providing access to protected information according to at least some aspects described herein. In FIG. 5A, an employee assigned Business Purpose 1 is permitted access to portions of customer data. For instance, in the user profile table 500, an employee having Business Purpose 1 is permitted access to outside data (also known as non-experience data that may come from an outside source such as a credit bureau or other source but not from first hand experience between the customer and the company or entity) if the customer has not elected to "opt out," as indicated in field 502. Also, per government regulations, the employee assigned Business Purpose 1 is not permitted access to any data associated with a California customer, as indicated by the access value 0 in field 504.

Table 510 in FIG. 5A provides one example party privacy look-up or customer preference table. As shown, various customers are listed in column 512 As discussed above, customers may have the option to "opt out" of sharing information.

Accordingly, column 514 includes a customer opt out value for each listed customer. In this example, a customer opt out value of 1 indicates that the information can be shared or provided and 0 indicates that the customer desires the information remain private and not be shared or disclosed. In addition, column 516 includes an indication of whether the customer is a California resident and thus, by law, their information may not be shared. Generally, in the example shown, a value of 0 may indicate that the customer is not a California resident, while a value of 1 may indicate that the customer is a California resident. In some examples, access values may be hierarchical. That is, even if a user has opted to permit sharing of data, if the user is a California customer, by law, that data may not be shared and the California resident access value may override the customer sharing access value.

User profile table 500 and party privacy look-up table 510 may be joined to provide a view that includes access to data according to the rules and access values assigned in tables 500 and 510. View table 520 includes a listing of each customer provided in the party privacy look-up table 510. However, because customer ###3 is indicated as being a California resident in column 516 of table 510, no information is available for that customer in the view table 520. In some examples, not even the customer name or identifier may be made available. Customer ###1 is listed and his or her annual income is listed. Annual income may, in some examples, be considered outside data that came from an external source rather than from first hand interaction between the company or entity and the customer. Accordingly, per user profile table 500, that information may be accessed if the customer has not opted out. As indicated in table 510, customer ###1 has not opted out and thus, that data is available to the employee assigned Business Purpose 1.

Alternatively, customer ###2 has opted out of sharing external data. Thus, annual income data for customer ###2 is not available to be accessed or viewed by the employee assigned Business Purpose 1.

FIG. 5B illustrates another example scenario for providing access to data. In user privacy profile table 550, an employee assigned Business Purpose 2 is identified and various access values for different data elements are provided. For instance, in field 552 an access value of 0 is provided indicating that the employee assigned Business Purpose 2 may not access information related to color, race or ethnicity. In field 554, the employee assigned Business Purpose 2 is permitted access to marital status information. In field 556 the employee assigned Business Purpose 2 may access outside data only if the customer has not opted out and in field 558 the employee may not access any information related to California based customers.

Account privacy look-up or customer preference table 560 provides a listing of accounts in column 562 and various access values for whether customers have opted out of sharing information for those accounts in column 564 and whether the customer associated with the account is California based in column 566. In a situation in which the company using the system is a financial institution, the accounts listed may be credit cards, savings accounts, checking accounts, money market accounts, and the like.

View table 570 may then be generated based on the data contained in user privacy profile table 550 and account privacy look-up table 560. As shown in table 570, the listing of customer accounts from column 562 in table 560 is provided in column 572. Also, various information regarding the account or customer associated with the account is provided based on the access values assigned for a person assigned Business Purpose 2. That is, because an employee assigned Business Purpose 2 may not have access to any information regarding color, race or ethnicity (as shown in field 552 of table 550) no information regarding color, race or ethnicity is provided in table 570. Also, although Account ###-###2 indicated that access to his or her data was permitted, that individual is a California resident and thus, by law, access to that information may not be provided. Accordingly, all information for that account in table 570 is blocked.

FIGS. 5A and 5B provide simplified examples of providing access to data based on various assigned business purposes and access values. As discussed, additional weighting systems and the like, may be used to determine access to various data elements without departing from the invention.

Figure 6:
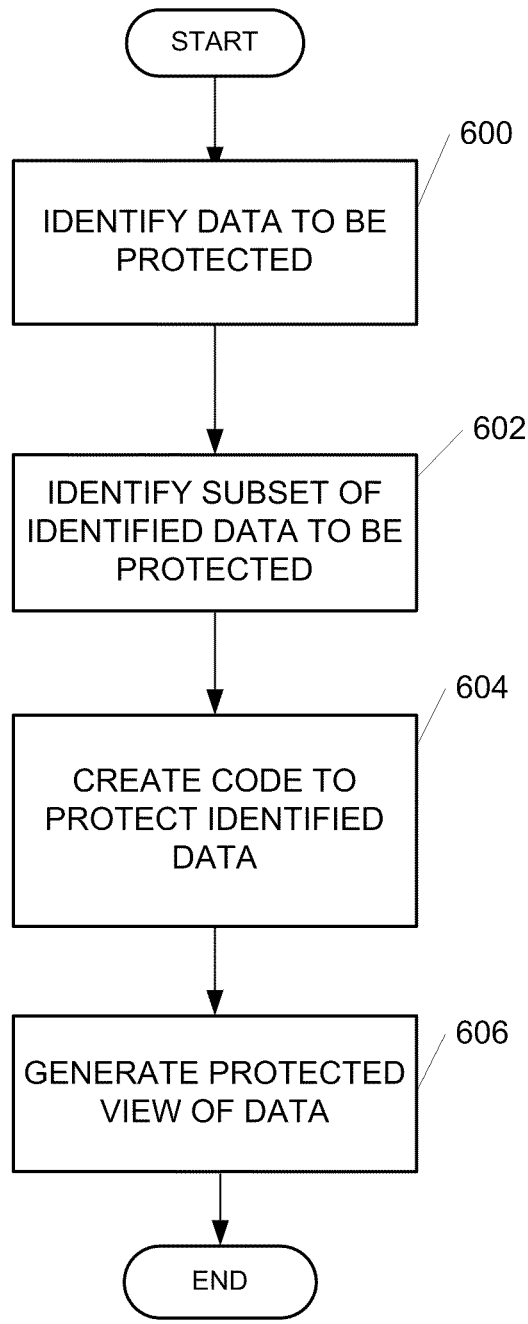
FIG. 6 illustrates one example method of restricting access to data in accordance with at least some aspects described herein.

In some examples, the privacy code may be applied to data stored at a data warehouse to securely provide access to the data in accordance with the rules determined in the various look-up tables and based on the assigned business purposes and access values. FIG. 6 illustrates one example flow chart in which a view is generated including the security code and data, for instance, data stored in a data warehouse. In step 600 data to be protected is identified. In some examples, identifying the data may include identifying a data table, such as a data table stored at a data warehouse. In step 602, a subset of the identified data is identified for protection. For instance, a look-up table may be used to identify portions of the identified data that may be protected. In step 604, code is written to protect the identified subset of the data. The code may include rules to provide access to the data based on an assigned business purpose as described above. In step 606, a view is generated based on the created code to provide access to the protected data based on rules associated with a business purpose assigned to the individual viewing the data.

Figure 7:
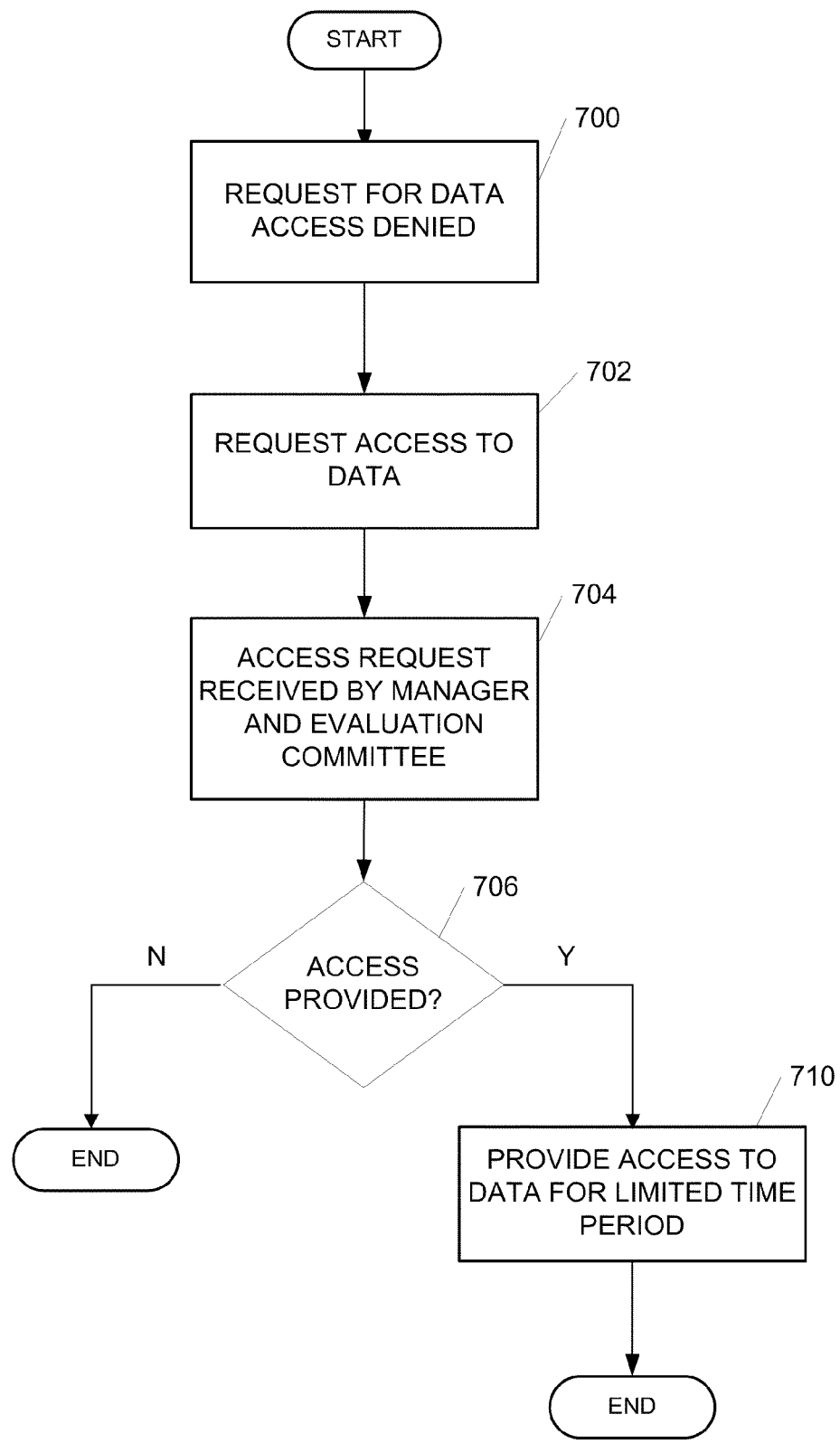
FIG. 7 illustrates one example method of overriding the access settings of the data security system in accordance with at least some aspects described herein.

As mentioned above, an employee or user restricted access to various data elements may request to override that restricted access as desired. Various override systems may be used without departing from this invention. FIG. 7 illustrates one example flow chart of a method of overriding the data access restriction. In step 700 an employee or user requests to access data and is denied. In step 702 the employee submits a request to view data. In some examples, the employee may access a user interface of an automated system that facilitates the override requests. In step 704, the manager of the employee and an evaluation committee receives the request to access the data and processes the request. Processing the request may include determining the purpose for accessing the data, the business purpose of the employee accessing the data, and the like. In step 706 a determination is made as to whether access to the data is permitted. If access to the data is denied, the method ends. If access to the data is allowed, the employee/user may receive access to the desired data for a limited time period in step 708. In some examples, the limited time period may be one year. In other examples, the limited time period may be less than one year (e.g., six months, six weeks, one month, one week, and the like).

In another example, if an employee is denied access to data, the employee may, in some arrangements, transfer to another user profile (i.e., another business purpose that has been assigned to that user) to attempt to access that data from that profile. For instance, some users/employees may have multiple business purposes assigned to them due to differing job duties, responsibilities, manager to whom the employee reports, organization in which the employee works, and the like. In these instances, the employee may have multiple user profiles, such as one for each business purpose assigned to the employee. Accordingly, if the employee does not have access to certain data when logged in or attempting to access the data under a first user profile, the employee may then attempt to access the data under a second user profile.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   identifying, by a computing device having a processor and memory, a first plurality of business purpose activities associated with an entity;
   assigning, by a computing device having a processor and memory, a second plurality of business purpose activities to each employee of a plurality of employees of the entity, the second plurality of business purpose activities being a subset of the first plurality of business purpose activities;
   identifying, by the computing device, a plurality of data elements to be protected, the plurality of data elements including data elements internal to the entity and data elements received by the entity from a third party, the plurality of data elements being associated with at least one user of the entity;
   assigning, by the computing device, a numeric access value to each data element of the plurality of data elements for each identified business purpose activity of the first plurality of business purpose activities, wherein the numeric access value indicates a level of access to the data element of the plurality of data elements to which it is assigned permitted for an employee of the entity acting under the respective business purpose activity; and
   determining, by the computing device, whether a data element of the plurality of protected data elements associated with the at least one user of the entity is provided by a third-party entity different from the entity,
   wherein when it is determined that the data element is provided by the third-party entity, the numeric access value is conditioned on a preference of the at least one user of the entity.

2. The method of claim 1, wherein the plurality of business purpose activities are assigned to the each employee of the plurality of employees based on at least one of: the employee's job duties and the employee's positions within the entity.

3. The method of claim 1, further including:
   receiving a request by an employee to access a first data element;
   identifying a first business purpose activity under which the employee is acting, the first business purpose activity being a business purpose activity of the second plurality of business purpose activities; and
   determining, based on a numeric access value assigned to the first data element, whether the first business purpose activity is authorized to access the first data element.

4. The method of claim 3, further including, responsive to determining that the first business purpose activity is authorized to access the first data element, providing the employee access to the first data element.

5. The method of claim 4, wherein providing access to the first data element includes generating a view including the first data element, and providing access to the first data element occurs in response to:
   determining that access to the first data element is conditioned on the preference of the user associated with the first data element; and
   determining that the preference of the user indicates that the user has consented to share the first data element.

6. The method of claim 3, further including:
   responsive to determining that the first business purpose activity is authorized to access the first data element, determining that access to the first data element is conditioned on the preference of the user associated with the first data element;
   determining that the preference of the user indicates that the user has not consented to share the first data element, denying access to the first data element; and
   generating a view that does not include the data element.

7. The method of claim 1, wherein assigning the numeric access value to each data element for each identified business purpose activity of the first plurality of business purpose activities includes selecting from one of at least three numeric access values for each data element for each business purpose activity of the first plurality of business purpose activities: a first numeric access value indicating that employees associated with the respective business purpose activity have access to the data element; a second numeric access value indicating that employees associated with the respective business purpose activity do not have access to the data element; and a third numeric access value indicating that employees associated with the respective business purpose activity have conditional access to the data element based on the preference of the at least one user.

8. The method of claim 1, further comprising:
   receiving, by the computing device, a first request by the employee to access a first data element, the employee being assigned the second plurality of business purpose activities;
   identifying a first business purpose activity of the second plurality of business purpose activities under which the employee is acting;
   determining, based on a numeric access value assigned to the first data element, whether the first business purpose activity is authorized to access the first data element;
   responsive to determining that the first business purpose activity is not authorized to access the first data element, receiving a second request by the employee to access the first data element;
   identifying a second business purpose activity of the second plurality of business purpose activities under which the employee is acting;
   determining, based on the numeric access value assigned to the first data element, whether the second business purpose activity is authorized to access the first data element; and
   responsive to determining that the second business purpose is authorized to access the first data element, generating, by the computing device, a display for the employee, wherein the display displays the first data element.

9. One or more non-transitory computing readable media storing computer readable instructions that, when executed by a processor, cause one or more computing devices to:
    identify a first plurality of business purpose activities associated with an entity;
    assign a second plurality of business purpose activities to each employee of a plurality of employees of the entity, the second plurality of business purpose activities being a subset of the first plurality of business purpose activities;
    identify a plurality of data elements to be protected, the plurality of data elements including data elements internal to the entity and data elements received by the entity from a third party, the plurality of data elements being associated with at least one user of the entity;
    assign a numeric access value to each data element of the plurality of data elements for each identified business purpose activity of the first plurality of business purpose activities, wherein the numeric access value indicates a level of access to the data element of the plurality of data elements to which it is assigned permitted for an employee of the entity acting under the respective business purpose activity; and
    determine whether a data element of the plurality of protected data elements associated with the at least one user of the entity is provided by a third-party entity different from the entity, wherein when it is determined that the data element is provided by the third-party entity, the numeric access value is conditioned on a preference of the at least one user of the entity.

10. The one or more non-transitory computer-readable media of claim 9, wherein the plurality of business purpose activities are assigned to the each employee of the plurality of employees based on at least one of: the employee's job duties and the employee's positions within the entity.

11. The one or more non-transitory computer-readable media of claim 9, further including instructions that, when executed, cause the one or more computing devices to:
    receive a request by an employee to access a first data element;
    identify a first business purpose activity under which the employee is acting, the first business purpose activity being a business purpose activity of the second plurality of business purpose activities; and
    determine, based on the numeric access value assigned to the first data element, whether the first business purpose activity is authorized to access the first data element.

12. The one or more non-transitory computer-readable media of claim 11, further including instructions that, when executed, cause the one or more computing devices to:
    responsive to determining that the first business purpose activity is authorized to access the first data element, provide the employee access to the first data element.

13. The one or more non-transitory computer-readable media of claim 12, wherein providing access to the first data element includes generating a view including the first data element, and providing access to the first data element occurs in response to:
    determining that access to the first data element is conditioned on the preference of the user associated with the first data element; and
    determining that the preference of the user indicates that the user has consented to share the first data element.

14. The one or more non-transitory computer-readable media of claim 11, further including instructions that, when executed, cause the one or more computing devices to:
    responsive to determining that the first business purpose activity is authorized to access the first data element, determine that access to the first data element is conditioned on the preference of the user associated with the first data element;
    determine that the preference of the user indicates that the user has not consented to share the first data element, denying access to the first data element; and
    generate a view that does not include the data element.

15. An apparatus, comprising:
    a processor; and
    memory coupled to the processor and storing instructions that, when executed by the processor, cause the apparatus to:
        identify a first plurality of business purpose activities associated with an entity;
        assign a second plurality of business purpose activities to each employee of a plurality of employees of the entity, the second plurality of business purpose activities being a subset of the first plurality of business purpose activities;
        identify a plurality of data elements to be protected, the plurality of data elements including data elements internal to the entity and data elements received by the entity from a third party, the plurality of data elements being associated with at least one user of the entity;
        assign a numeric access value to each data element of the plurality of data elements for each identified business purpose activity of the first plurality of business purpose activities, wherein the numeric access value indicates a level of access to the data element of the plurality of data elements to which it is assigned permitted for an employee of the entity acting under the respective business purpose activity; and
        determine whether a data element of the plurality of protected data elements associated with the at least one user of the entity is provided by a third-party entity different from the entity,
        wherein when it is determined that the data element is provided by the third-party entity, the numeric access value is conditioned on a preference of the at least one user of the entity.

16. The apparatus of claim 15, wherein the plurality of business purpose activities are assigned to the each employee of the plurality of employees based on at least one of: the employee's job duties and the employee's positions within the entity.

17. The apparatus of claim 15, further including instructions that, when executed, cause the apparatus to:
    receive a request by an employee to access a first data element;
    identify a first business purpose activity under which the employee is acting, the first business purpose activity being a business purpose activity of the second plurality of business purpose activities; and
    determine, based on the numeric access value assigned to the first data element, whether the first business purpose activity is authorized to access the first data element.

18. The apparatus of claim 17, further including instructions that, when executed, cause the one or more computing devices to:
    responsive to determining that the first business purpose activity is authorized to access the first data element, provide the employee access to the first data element.

19. The apparatus of claim 18, wherein providing access to the first data element includes generating a view including the first data element, and providing access to the first data element occurs in response to:
- determining that access to the first data element is conditioned on the preference of the user associated with the first data element; and
- determining that the preference of the user indicates that the user has consented to share the first data element.

20. The apparatus of claim 17, further including instructions that, when executed, cause the one or more computing devices to:
- responsive to determining that the first business purpose activity is authorized to access the first data element, determine that access to the first data element is conditioned on the preference of the user associated with the first data element;
- determine that the preference of the user indicates that the user has not consented to share the first data element, denying access to the first data element; and generate a view that does not include the data element.

\* \* \* \* \*